United States Patent [19]

Riek

[11] Patent Number: 4,559,789
[45] Date of Patent: Dec. 24, 1985

[54] VARIABLE CYCLE MOISTURIZING CONTROL CIRCUIT FOR A GAS-LIQUID CONTACT PAD

[75] Inventor: Jan C. Riek, Madison, Wis.

[73] Assignee: Research Products Corporation, Madison, Wis.

[21] Appl. No.: 589,730

[22] Filed: Mar. 15, 1984

[51] Int. Cl.⁴ .................. G05D 23/19; F28D 3/00
[52] U.S. Cl. ...................... 62/157; 62/171; 236/46 F
[58] Field of Search ............... 62/171, 157, 158, 231; 236/46 R, 46 F, 44 R, 44 C; 261/26

[56] References Cited

U.S. PATENT DOCUMENTS

| | | |
|---|---|---|
| 2,947,452 | 8/1960 | Frohmader et al. ............ 222/187 |
| 3,427,005 | 2/1969 | Kuykendall .................... 261/26 |
| 3,887,666 | 6/1975 | Heller et al. ................... 261/130 |
| 3,965,691 | 6/1976 | Van Huis ........................ 62/157 |
| 4,170,117 | 10/1979 | Faxon ............................ 62/183 |
| 4,182,131 | 1/1980 | Marshall et al. ................ 62/91 |
| 4,266,406 | 5/1981 | Ellis .............................. 62/183 |
| 4,290,274 | 9/1981 | Essex ............................ 62/157 |
| 4,328,680 | 5/1982 | Stamp, Jr. et al. ............. 62/155 |
| 4,338,266 | 7/1982 | Flower .......................... 261/94 |
| 4,353,219 | 10/1982 | Patrick, Jr. .................... 62/183 |

Primary Examiner—Harry Tanner
Attorney, Agent, or Firm—Andrus, Sceales, Starke & Sawall

[57] ABSTRACT

The invention provides a variable cycle moisturizing control circuit for a gas-liquid contact pad (8, 18) in humidifiers (1), precoolers (17) and the like, supplied with fluid from a solenoid valve (34). Temperature sensitive electric circuit means (FIG. 4) cyclically actuates the valve between ON and OFF states for intermittently moisturizing the pad with an intermittent flow of liquid, and includes means (26, 30) for variably changing the intermittent flow in response to temperature by changing the relative timing of the ON and OFF timed intervals such that the duration of one increases relative to the other. User accessible preadjustment means (38, 40) manually changes the length of one of the timing intervals, to preset the initial relative timing of the intervals according to pad size to afford a relatively longer ON time for larger pads, whereafter the other interval is automatically varied in response to increasing temperature.

8 Claims, 5 Drawing Figures

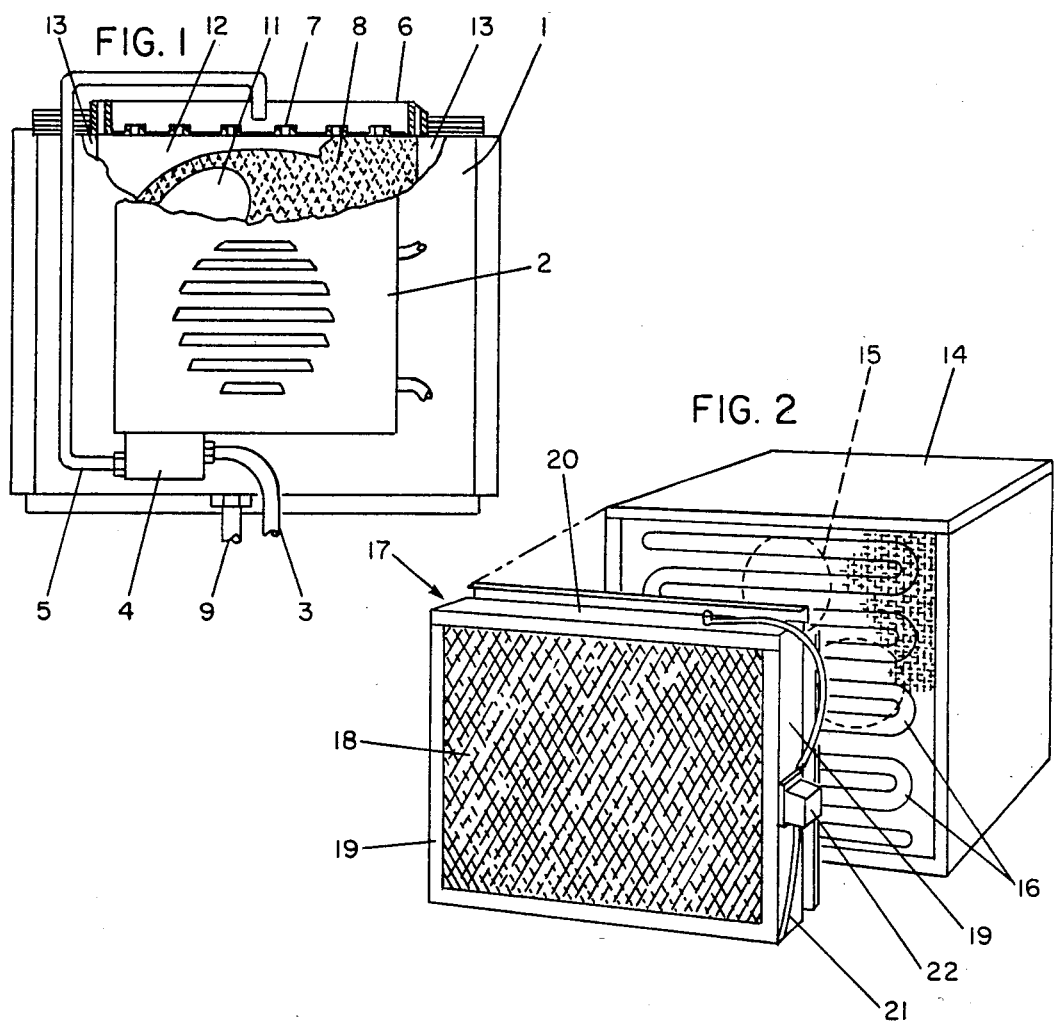
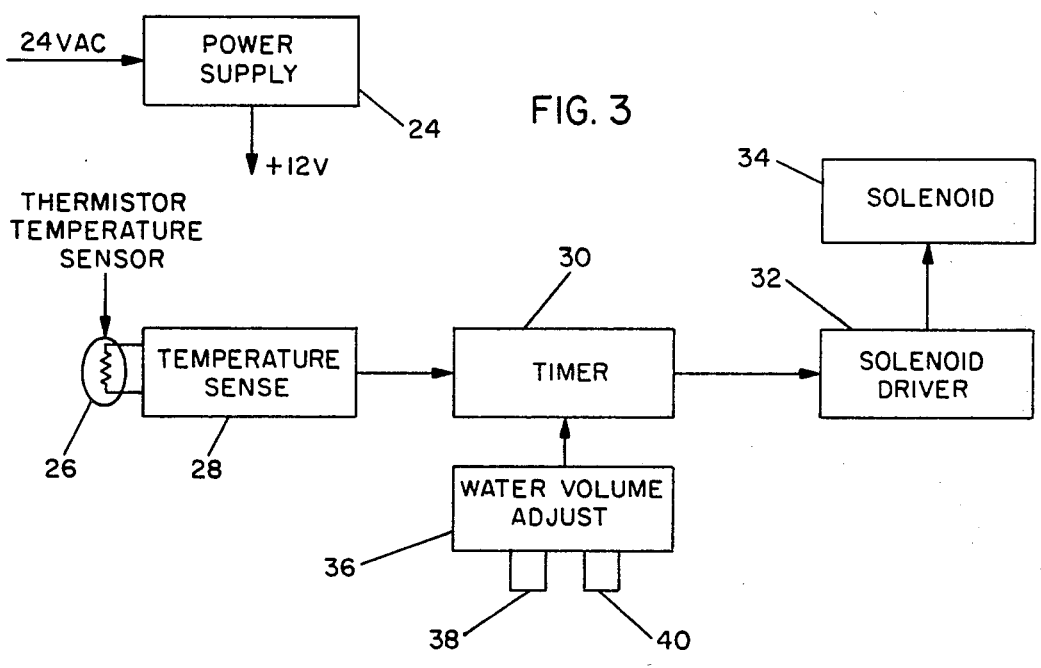

VARIABLE CYCLE MOISTURIZING CONTROL CIRCUIT FOR A GAS-LIQUID CONTACT PAD

BACKGROUND AND SUMMARY

The invention relates to devices for conditioning air using gas-liquid contact pads, such as precoolers, evaporative coolers, humidifiers, and the like.

In the noted applications, there is a need for saving water. The water distribution system operates best with high line pressure. Also, at high ambient temperatures more water should flow to the pad than at low temperatures. There is further a need for water volume adjustment according to differing pad sizes.

The present invention utilizes variable cycle moisturizing of the pad by the intermittent flow of water or other liquid thereto. The circuit has a first disabled mode, below a given temperature, blocking water flow to the pad. The circuit has a second enabled mode, above the given temperature, providing the variable cycle moisturizing, with cyclic intermittent ON and OFF states of water flow.

Once in the enabled Intermittent mode, the control circuit is further responsive to changing temperature to vary the intermittent flow by changing the relative timing of the ON and OFF timed intervals such that the duration of one increases relative to the other in response to changing temperature above the noted given temperature. This provides automatic temperature responsive adjustment of cumulative water volume while in the variable cycle moisturizing mode.

The control circuit further enables the user to manually preadjust the initial relative timing of the intervals according to pad size, to afford a relatively longer ON interval for larger pads. This enables the same circuit to be used with different size pads, thus affording a universal control circuit for a plurality of different pad sizes. The circuit can be easily customized by the user for his particular pad size, preferably by cutting or not cutting one or more wires according to programmed user instructions keyed to pad size.

BRIEF DESCRIPTION OF THE DRAWINGS

FIG. 1 is a perspective view of a liquid distributor for a humidifier or the like.

FIG. 2 is an exploded schematic perspective view of an air conditioner and precooler.

FIG. 3 is a schematic block diagram of a variable cycle control circuit in accordance with the invention.

DETAILED DESCRIPTION

Figure 4:
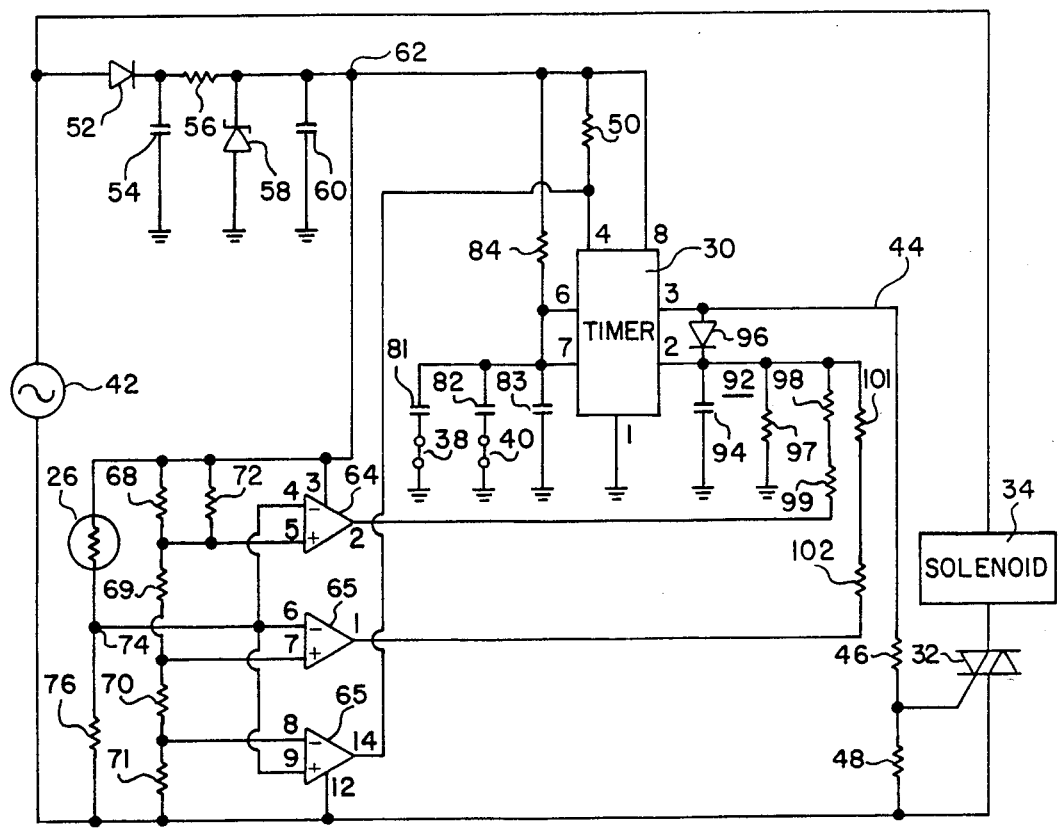
FIG. 4 is a circuit diagram of a variable cycle control circuit in accordance with the invention.

FIG. 1 shows a humidifier like that shown in Frohmader et al U.S. Pat. No. 2,947,452, assigned to the assignee of the present invention. The assembly includes a humidifier housing 1 upon which is mounted a fan housing 2 containing an electric motor (not shown) therein, a water supplying feed line 3, a solenoid valve 4 controlling the flow of water, a distributor supply line 5 for feeding water to the trough-like distributor 6. The water flows through openings 7 in distributor 6 downwardly into gas-liquid contact pad 8 and exits at discharge port 9. A fan 11, driven by the electric motor, turns in a circular opening in fan baffle 12 to draw air through contact pad 8 after which the humidified air is discharged from the apparatus through ducts 13. Gas-liquid contact pad 8 is an evaporative element of suitable interstitial filter-like material, for example as shown in Flower U.S. Pat. No. 4,338,266, assigned to the assignee of the present invention.

FIG. 2 shows a refrigeration type air conditionrt 14 like that in said Flower U.S. Pat. No. 4,338,266 and having the ususal well-known parts including a suitably operated fan 15 which draws air in across condenser coils 16. It is desirable to precool coils 16 to increase the efficiency of the unit. For this purpose, a precooler 17 is adapted to be attached to the intake side of air conditioner 14, closely adjacent coils 16. Precooler 17 is shown as generally including an evaporative precooler pad 18 held in a frame 19 and having the usual water distributor 20 disposed along its top edge. Distributor 20 is supplied with water through a suitable water line 21 having the usual control valve 22 therein. As water flows downwardly by gravity through pad 18, air (represented by the arrows) flows through and is evaporatively precooled by contact with the water before contacting coils 16. A drain, not shown, is disposed along the bottom of precooler 17 to receive any remaining water which has not evaporated by contact with the air.

FIG. 3 shows a block level diagram of the variable cycle control circuit of the present invention. The input from an AC voltage source, such as 24 volts AC, is converted to a given DC level, such as 12 volts, by power supply 24 for powering the remaining circuit components. A temperature sensor 26, such as a thermistor, is part of temperature sensitive control circuitry 28 for controlling timer 30 which in turn controls actuation of a solenoid driver switch 32, such as a triac, which in turn controls actuation of solenoid valve 34 for controlling the fluid supplied to the gas-liquid contact pad, comparably to solenoids 4 and 22, FIGS. 1 and 2. Solenoid 34 is driven open or ON to replenish evaporated water.

Timer 30 has a first disabled mode below a given temperature sensed by sensor 26, maintaining the solenoid OFF. When the ambient air temperature sensed by sensor 26 rises above the given temperature, timer 30 enters a second enabled mode which provides intermittent ON and OFF control of the solenoid. In this enabled intermittent mode, the solenoid valve is actuated between ON and OFF states for intermittently moisturizing the contact pad, such as 8 or 18, FIGS. 1 and 2, with an intermittent flow of liquid. Furthermore, the circuit variably changes the intermittent flow in response to sensed ambient temperature above the noted given temperature. The relative timing of the ON and OFF timed intervals is varied according to sensed ambient temperature such that the duration of one increases relative to the other in response to changing temperature at 26. This adjusts the cumulative amount of fluid supplied to the pad by the cyclic intermittent flow.

The circuit further includes water volume adjustment means 36 presettable by the user according to different pad sizes to afford a relatively longer ON timed interval for larger pads. This enables a single circuit to service a plurality of pad sizes, affording a universal control circuit which can be customized by the user for his particular pad size. The preadjustment by the user manually sets the initial relative timing between ON and OFF cyclic intervals. This relative timing is further automatically adjusted in response to rising temperature.

In the particular embodiment disclosed, preadjustments for pad size are made by cutting wires at 38 or 40. For large pads, no wires are cut and the cyclic intermittent ON time is 50 seconds. Cutting wire 38 reduces ON time to 33 seconds. For small pads, wires 38 and 40 are cut, giving an ON time of 20 seconds.

Further in the disclosed embodiment, the length of the OFF state timed interval is changed in response to changing ambient temperature, in order to vary the relative timing in the variable cycle moisturizing mode. The temperature control cycle has three control ranges that vary the timer OFF time. Below 85° F., no water flows. Between 85° and 95° F., the water is OFF for 100 seconds. Between 95° and 105° F., the water is OFF for 60 seconds. Above 105° F., the water is OFF for 40 seconds. Sensor 26 is a negative temperature coefficient (NTC) thermistor, and solenoid driver switch 32 is a triac.

Timing is done without the use of a clock. The timer circuit has two time constants, one determining ON time, and the other determining OFF time. The first time constant is provided by an RC network and is manually preadjusted by the user in accordance with programmed instructions keyed to pad size. The other time constant is provided by a second RC network and is automatically varied according to sensed ambient temperature after timer 30 enters its variable cycle ONOFF enabled mode.

Referring to FIG. 4, an AC voltage source 42, for example 24 volts AC, is connected in circuit with solenoid 34 and triac 32. Timer 30 is a National Semiconductor 555 integrated circuit chip, and manufacturer-assigned pin numbers are used to facilitate understanding. Output pin 3 is connected by line 44 through resistor 46 to the gate of triac 32 for triggering the latter into a conductive ON state to conduct current and complete a circuit through solenoid 34 from voltage source 42. Resistor 48 provides gate to cathode protection. Timer 30 is powered at its input pin 8 and its input pin 4 through resistor 50 by power supply 24, FIG. 3, including rectifying diode 52, filtering capacitor 54, dropping resistor 56, clamping zener diode 58, and filtering capacitor 60, yielding for example a level 12 volt DC output at node 62.

The 12 volt DC level at node 62 also supplies the power for a quadcomparator National Semiconductor LM339N integrated circuit chip, of which three of the comparators 64–66 are used, and manufacturer-assigned pin numbers are shown to facilitate understanding. A multiple voltage divider network provided by resistors 68–71, and by resistor 72 for comparator 64, provides differing reference level input voltages to the comparators for comparison at the other input to a voltage from node 74 in the voltage divider network formed by NTC thermistor 26 and resistor 76.

As sensed ambient temperature increases, the resistance of NTC thermistor 26 decreases, which in turn drops more of the voltage across resistor 76, increasing the voltage at node 74. Likewise, as temperature decreases, the resistance of NTC thermistor 26 increases and the voltage at node 74 decreases.

At sensed ambient temperatures below a given temperature, such as 85° F., the voltage at positive input pin 9 of comparator 66 from node 74 is less than the reference voltage at negative input pin 8, and output pin 14 is thus low, which in turn presents a low state at pin 4 of timer 30. With pin 4 low, timer 30 is in a disabled mode wherein output pin 3 is low, and hence triac 32 is OFF, whereby solenoid 34 is OFF or closed, and no water is supplied to the contact pad.

When the sensed ambient temperature at 26 rises above the given temperature such as 85° F., the voltage at input pin 9 of comparator 66 from node 74 rises above that at reference input pin 8, and output pin 14 goes high which in turn provides a high state at pin 4 of timer 30. When pin 4 is high, timer 30 is in an enabled mode, and output pin 3 transitions high to thus trigger triac 32 to its conductive ON state, thus actuating solenoid valve 34 whereby the latter supplies water to the contact pad. This high ON state at pin 3 is shown at 78 in FIG. 5.

Figure 5:
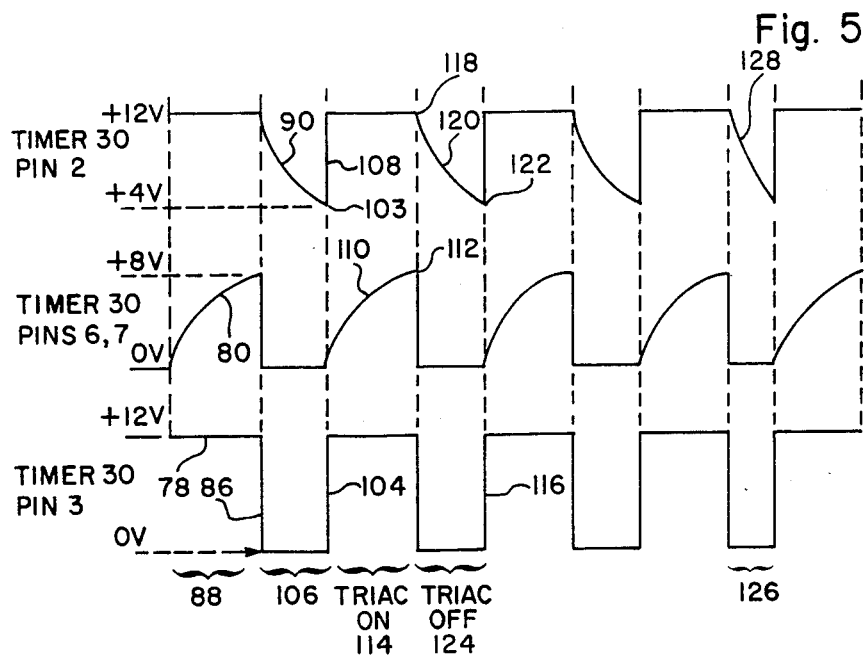
FIG. 5 is a timing diagram illustrating operation of the circuit of FIG. 4.

When timer 30 is enabled, the voltage at input pins 6 and 7 begins to rise, as shown at 80 in FIG. 5, due to the charging of capacitors 81–83 through resistor 84. When the charge on pins 6 and 7 reaches a given level, such as 8 volts, FIG. 5, output pin 3 transitions low as shown at 86, terminating the ON state timed interval 88 of triac 32.

The length or duration of ON state interval 88 is determined by the charging rate of capacitance 81–83. These capacitors have user accessible wiring connections such as 38 and 40, FIGS. 3 and 4. User selected preadjustment of the ON state timing interval 88 according to different pad sizes is accomplished by cutting wires at 38 or 40 to change the number of parallel charging capacitors in circuit with timer 30. As noted above, with no wires cut the pulse ON time 88 is 50 seconds. Cutting wire 38 removes capacitor 81 from the circuit and the ON time 88 is reduced to 33 seconds. For small pads, wires 38 and 40 are cut, removing capacitors 81 and 82 from the circuit and giving an ON time of 20 seconds.

Output pins 2 and 3 of timer 30 transition high together. While output pin 3 can immediately transition low as at 86, FIG. 5, output pin 2 gradually transitions low as shown at 90, due to RC network 92, FIG. 4. Capacitor 94 is charged during the ON state from pin 2, and from pin 3 through diode 96. The decay rate of capacitor 94 is determined by the plurality of resistor branches provided by resistors 97–102. When the charge at pin 2 has dropped to a given level 103, such as 4 volts, FIG. 5, pin 3 may again transition high, as shown at 104. This terminates the OFF state interval 106.

When pins 2 and 3 of timer 30 transition high at 108 and 104, the selected combination of capacitors 81–83 begins charging again such that the voltage at pins 6 and 7 of timer 30 rises, as shown at 110, and when the given threshold such as 8 volts is reached at 112, the triac ON state timed interval 114 ends. Pin 3 then transitions low at 116, and pin 2 begins to transition low at 118 with a delayed decay as shown at 120. When the voltage level at pin 2 decays to given level 122, the triac OFF state timed interval 124 ends, and pins 2 and 3 transition high to start the next ON state interval, and the voltage at input pins 6 and 7 begins to rise as capacitors 81–83 charge.

In the timing diagram in FIG. 5, ON states 88 and 114 are of equal duration. They may be made of different duration according to cutting of wires 38 and/or 40. OFF intervals 106 and 124 are of equal duration because the temperature has stayed between 85° F. and 95° F.

If the sensed ambient temperature at 26 rises above the above noted first threshold, such as 95° F., the voltage at negative input pin 6 of comparator 65 from node 74 rises above the voltage at reference input pin 7, and output pin 1 goes low. The low state of pin 1 of comparator 65 provides faster discharging of capacitor 94 through resistors 101 and 102. This faster discharge of capacitor 94 shortens the triac OFF state timed interval, such as shown at 126 in FIG. 5. The decay rate of output pin 2 of timer 30 as shown at 128 is faster because of the additional discharge path through resistors 101 and 102 to low pin 1 of comparator 65.

If the sensed ambient temperature at 26 further rises above a yet higher threshold, such as 105° F., the voltage at negative input pin 4 of comparator 64 from node 74 rises above the reference voltage at positive input pin 5, and output pin 2 of comparator 64 transitions low. This low state of pin 2 provides an additional discharge path for capacitor 94 through resistors 98 and 99, to thus further increase the discharge decay rate at pin 2 of timer 30, and further shorten the triac OFF state timed interval. As noted above, for the disclosed embodiment, below 85° F., no water flows; between 85° and 95° F., the water is OFF for 100 seconds; between 95 and 105° F., the water is OFF for 60 seconds; and above 105° F., the water is OFF for 40 seconds.

It is recognized that various modifications are possible within the scope of the appended claims.

I claim:

1. A variable cycle moisturizing control circuit for a gas-liquid contact pad in precoolers, humidifiers and the like, comprising:
   liquid supply means for said pad;
   valve means in said liquid supply means for controlling the supply of fluid to said pad;
   temperature sensitive electric circuit means for actuating said valve means between ON and OFF states for intermittently moisturizing said pad with an intermittent flow of liquid, and including means for variably changing said intermittent flow in response to temperature comprising timing means having a first disabled mode below a given temperature maintaining said valve means in said OFF state, and a second enabled mode above said given temperature providing ON and OFF cyclic timed intervals for said ON and OFF states, respectively, said timing means in said enabled mode changing the relative timing of said ON and OFF timed intervals such that the duration of one increases relative to the other in response to changing temperature; and
   water volume adjustment means enabling the user to manually preadjust the initial relative timing of said ON and OFF intervals according to differing pad sizes, whereby to afford a universal control circuit for a plurality of different pads, which can be customized by the user for his particular pad size.

2. A variable cycle moisturizing control circuit for a gas-liquid contact pad in precoolers, humidifiers and the like, comprising:
   liquid supply means for said pad;
   valve means in said liquid supply means for controlling the supply of fluid to said pad;
   temperature sensitive electric circuit means for actuating said valve means between ON and OFF states for intermittently moisturizing said pad with an intermittent flow of liquid, and including temperature responsive varying means for variably changing said intermittent flow in response to temperature comprising timing means for varying the duration of one of said states in response to sensed ambient temperature, to adjust the amount of fluid supplied to said pad; and
   means independent of said temperature responsive varying means and presettable by the user according to different sizes of said pad for varying the duration of the other of said states to increase the amount of fluid supplied for larger pads.

3. A variable cycle moisturizing control circuit for a gas-liquid contact pad supplied with fluid from controllable valve means, comprising:
   switch means for controlling said valve means and actuatable between ON and OFF states;
   timing means for actuating said switch means and having cyclic ON and OFF timed intervals respectively controlling said ON and OFF states of said switch means;
   temperature sensitive means responsive to ambient temperature for changing the relative timing of said ON and OFF timed intervals such that the duration of one increases relative to the other in response to changing temperature, said timing means having a first disabled mode below a given temperature maintaining said switch means in said OFF state, and having a second enabled mode above said given temperature providing said ON and OFF timed intervals; and
   means for user preadjustment of the initial relative timing of said intervals according to pad size to afford a relatively longer ON timed interval for larger pads, whereafter the relative timing of said intervals is varied in response to ambient temperature based on the initially preadjusted longer ON time for larger pads, whereby to afford a universal control circuit for a plurality of different pad sizes, which can be customized by the user for his particular pad size.

4. A variable cycle moisturizing control circuit for a gas-liquid contact pad supplied with fluid from controllable valve means, comprising:
   switch means for controlling said valve means and actuatable between ON and OFF states;
   timing means for actuating said switch means and having cyclic ON and OFF timed intervals respectively controlling said ON and OFF states of said switch means;
   temperature sensitive means responsive to ambient temperature for changing the relative timing of said ON and OFF timed intervals such that the duration of one increases relative to the other in response to changing temperature;
   wherein said timing means has a first disabled mode below a given temperature and maintains said switch means in said OFF state, and has a second enabled mode above said given temperature providing said ON and OFF timed intervals;
   wherein said relative timing of said ON and OFF intervals is changed by an RC network in circuit with said timing means, and comprising a temperature sensor connected in circuit with said RC network to change the resistance value in the latter in response to changing temperature;
   and comprising:
   a plurality of comparators;
   means for supplying different respective reference voltages to said comparators, and supplying voltage to said temperature sensor;
   and wherein:
   said RC network has a plurality of branches for different temperature thresholds above said given temperature, one branch for each of said comparators;

said temperature sensor has a resistance which changes as a function of sensed ambient temperature, to thus provide a temperature dependent variable voltage thereacross;

said comparators compare said different respective reference voltages against said temperature dependent voltage from said temperature sensor for generating respective output signals to respective said branches for changing the timing constant of said RC network.

5. The invention according to claim 4 comprising a further enabling comparator sensing the temperature dependent voltage from said temperature sensor and comparing it to a given reference level for outputting a signal to said timing means to activate the latter to said enabled mode at said given temperature sensed by said temperature sensor.

6. The invention according to claim 4 wherein said timing means comprises an integrated circuit chip having a first output pin connected to said switch means, and a second output pin connected to said RC network, said first pin transitioning high and low without delay to turn ON and OFF said switch means, said second pin transitioning high without delay but having a delayed transition low determined by said RC network, said first pin being unable to transition high until said second pin is low, such that said switch means cannot be turned back ON until said second pin has decayed low, whereby the duration of said OFF timed interval is controlled by the RC time constant decay rate of said second pin which in turn is controlled by the resistance value of said plurality of branches which in turn is controlled by said plurality of comparators as controlled by said temperature sensor.

7. A variable cycle moisturizing control circuit for a gas-liquid contact pad supplied with fluid from controllable valve means, comprising:

switch means fo controlling said valve means and actuatable between ON and OFF states;

temperature sensor means responsive to ambient temperature; and timing means for actuating said switch means and having cyclic ON and OFF timed intervals respectively controlling said ON and OFF states of said switch means, said timing means having two time constants, a first time constant determining ON time, and a second time constant determining OFF time, one of said time constants being manually preadjustable by the user in accordance with programmed instructions keyed to differing pad sizes, the other of said time constants being automatically varied by said temperature sensor means in response to sensed ambient temperature.

8. The invention according to claim 7 wherein said timing means has a first disabled mode below a given temperature and maintains said switch means in said OFF state, and has a second enabled variable cycle moisturizing
mode above said given temperature providing said ON and OFF timed intervals, said one time constant being provided by an RC network manually preadjusted by the user to preset the initial relative timing of said intervals to afford relatively longer ON timed intervals for larger pads, said other time constant being provided by another RC network automatically varying the relative timing of said intervals in response to sensed ambient temperature based on the initially preadjusted relatively longer ON time for larger pads.

* * * * *